US006424992B2

(12) United States Patent
Devarakonda et al.

(10) Patent No.: US 6,424,992 B2
(45) Date of Patent: *Jul. 23, 2002

(54) AFFINITY-BASED ROUTER AND ROUTING METHOD

(75) Inventors: Murthy V. Devarakonda, Briarcliff Manor; Daniel Manuel Dias, Mahopac; German Sergio Goldszmidt, Dobbs Ferry; Guerney Douglass Holloway Hunt; Arun Kwangil Iyengar, both of Yorktown Heights; Richard Pervin King, Thornwood, all of NY (US); Rajat Mukherjee, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,361

(22) Filed: Oct. 8, 1997

Related U.S. Application Data

(60) Provisional application No. 60/033,833, filed on Dec. 23, 1996.

(51) Int. Cl.[7] ............................................... G06F 13/00
(52) U.S. Cl. ........................ 709/203; 709/226; 370/237
(58) Field of Search ................................. 370/675, 422, 370/237; 340/825.29; 709/100, 104, 105, 203, 224, 220, 226, 228, 232

(56) References Cited

U.S. PATENT DOCUMENTS

| | | | | |
|---|---|---|---|---|
| 5,371,852 A | * | 12/1994 | Attanasio et al. | 709/200 |
| 5,426,427 A | * | 6/1995 | Chinnock et al. | 395/200.69 |
| 5,495,426 A | * | 2/1996 | Waclawsky | 395/200.56 |

(List continued on next page.)

OTHER PUBLICATIONS

Computing Practices, "NCSA's World Wide Web Server: Design and Performance", T. T. Kwan et al., Nov. 1995, pp. 68–74, IEEE 1995.

Compcon 1996, "A Scalable and Highly Available Web Server", D. Dias et al., 8 pages.

Network Working Group, "DNS Support for Load Balancing", Rutgers University, T. Brisco, Apr. 1995, 7 pages.

(List continued on next page.)

Primary Examiner—Ayaz Sheikh
Assistant Examiner—Khanh Dinh
(74) Attorney, Agent, or Firm—Kevin M. Jordan; Gail H. Zarick; Anne Vachon Dougherty

(57) ABSTRACT

An affinity-based router and method for routing and load balancing in an encapsulated cluster of server nodes is disclosed. The system consists of a multi-node server, wherein any of the server nodes can handle a client request, but wherein clients have affinity to one or more of the server nodes that are preferred to handle a client request. Such affinity is due to state at the servers either due to previous routing requests, or data affinity at the server. At the multi-node server, a node may be designated as a TCP router. The address of the TCP router is given out to clients, and client requests are sent thereto. The TCP router selects one of the nodes in the multi-node server to process the client request, and routes the request to this server; in addition, the TCP router maintains affinity tables, containing affinity records, indicating which node a client was routed to. In processing the client request, the server nodes may determine that another node is better suited to handle the client request, and may reset the corresponding TCP router affinity table entry. The server nodes may also create, modify or delete affinity records in the TCP router affinity table. Subsequent requests from this client are routed to server nodes based on any affinity records, possibly combined on other information (such as load).

19 Claims, 5 Drawing Sheets

U.S. PATENT DOCUMENTS

| | | | | |
|---|---|---|---|---|
| 5,539,883 A | * | 7/1996 | Allon et al. | 395/675 |
| 5,548,724 A | * | 8/1996 | Akizawa | 709/203 |
| 5,583,862 A | * | 12/1996 | Callon | 370/397 |
| 5,603,029 A | * | 2/1997 | Aman et al. | 709/105 |
| 5,729,689 A | * | 3/1998 | Allard et al. | 709/228 |
| 5,774,660 A | * | 6/1998 | Brenden et al. | 395/200.31 |
| 5,841,775 A | * | 11/1998 | Huang | 370/422 |
| 6,219,786 B1 | * | 4/2001 | Cunningham et al. | 713/152 |

OTHER PUBLICATIONS

Network Working Group, "Domain Names—Implementation and Specification", P. Mockapetris, ISI, Nov. 1987, 53 pages.

IBM Research Division, Research Report, "A Virtual Multiprocessor Implemented by an Encapsulated Cluster of Loosly Coupled Computers", C. R. Attanasio et al., Oct. 1992, 13 pages.

* cited by examiner

Affinity Table 300

| Client address | Server node | Time |
|---|---|---|
| ⋮ | ⋮ | ⋮ |

Affiliation Table 400

| Affinity index | Pointer to list of affiliated indices |
|---|---|
| ⋮ | ⋮ |

Expanded Affinity Tables 500

| Client address | Affinity index | Server node | Time | Pointer to rule description |
|---|---|---|---|---|
| ⋮ | ⋮ | ⋮ | ⋮ | ⋮ |

AFFINITY-BASED ROUTER AND ROUTING METHOD

CROSS-REFERENCE TO RELATED PATENTS AND PATENT APPLICATIONS

The present invention claims priority to abandoned U.S. Provisional Patent application Ser. No. 60/033,833, filed Dec. 23, 1996.

The present invention is related to U.S. Pat. No. 5,918, 017, issued on Jun. 29, 1999, entitled "Weighted TCP Routing to Service Nodes in a Virtual Encapsulated Cluster" by C. Attanasio, G. Hunt, G. Goldszmidt, and S. Smith; and a divisional application thereof, Ser. No. 289,225 filed Apr. 9. 1999; and U.S. Pat. No. 5,371,852, issued Dec. 6, 1994, entitled "Method and Apparatus for Making a Cluster of Computers Appear as a Single Host", by Attanasio et al. The present invention has a common assignee with this co-pending patent application and U.S. patent which are hereby incorporated by reference in their entirety.

FIELD OF THE INVENTION

This invention relates generally to providing load balancing across distributed computing systems. More particularly it relates to a routing method for use in distributed systems including a set of server computing nodes, all or a subset of which can handle a client request, but where there is a preferred node or a set of nodes that are best suited to handle a particular client request.

GLOSSARY OF TERMS

While dictionary definitions apply to the terms herein, the following definitions of some terms are also provided to assist the reader:

An Encapsulated Cluster (EC) is characterized by a Connection-Router (CR) node and multiple server hosts providing a set of services (e.g. Web service, NFS, etc.). An example of a system which provides encapsulated clustering is described in U.S. Pat. No. 5,371,852, entitled "METHOD AND APPARATUS FOR MAKING A CLUSTER OF COMPUTERS APPEAR AS A SINGLE HOST ON A COMPUTER NETWORK".

A virtual encapsulated cluster system describes an improvement to the aforementioned U.S. Pat. No. 5,371, 852. Like the system of U.S. Pat. No. 5,371,852, a Virtual Encapsulated Cluster routes TCP information that crosses the boundary of a computer cluster. The information is in the form of port type messages. Incoming messages are routed and the servers respond so that each cluster appears as a single computer image to the external host. In a virtual encapsulated cluster a cluster of servers with a single TCP-router node is divided into a number of virtual clusters. Each virtual encapsulated cluster appears as a single host to hosts on the network which are outside the cluster. The messages are routed to members of each virtual encapsulated cluster in a way that keeps the load balanced among the set of cluster nodes.

A recoverable virtual encapsulated cluster is a virtual encapsulated cluster which has two TCP-router nodes, a primary and a backup. The cluster is augmented with a recovery manager which causes the backup TCP-router to become active if the primary fails. In addition methods are added so that the connection state at the time of failure can be reconstructed by (or alternatively known at) the backup router so that zero or the minimum number of client connections will be lost due to failure of the TCP-router node. Methods are also added so that the configuration/management information of the virtual encapsulated cluster are replicated (or constructed) at the backup. Finally the start up protocol of the TCP-router node is changed so that recovery of the primary router will not cause a failure in a backup which has taken over for it. This is described in the aforementioned co-pending patent application entitled "Weighted TCP Routing to Service Nodes in a Virtual Encapsulated Cluster," by Attanasio et al.

BACKGROUND

The traffic on the World Wide Web is increasing exponentially, especially at popular (hot) sites. In order to increase the processing capacity at such hot sites, a cluster of computing nodes, which we will refer to as a multi-node cluster, can be provided to handle the load. The multi-node cluster is (encapsulated) made to appear as one entity to clients, so that the added capacity provided by the multi-node cluster is transparent to clients. Client requests need to be distributed among nodes in the multi-node cluster.

One known method in the art that attempts to balance the load among nodes in a multi-node cluster is known as the Round-Robin Domain Name Server (RR-DNS) approach. The basic domain name server method is described in the paper by Mockapetris, P., entitled "Domain Names—Implementation and Specification", RFC 1035, USC Information Sciences Institute, November 1987. In the paper by Katz., E., Butler, M., and McGrath, R., entitled "A Scalable HTTP Server: The NCSA Prototype", Computer Networks and ISDN Systems, Vol. 27, 1994, pp. 155–164, round-robin DNS (RR-DNS) is used to balance the load across a set of web server nodes. In this approach, the set of nodes in the multi node server is represented by one URL (e.g. www.hotsite.com); a cluster subdomain for this distributed site is defined with its subdomain name server. This subdomain name server maps client name resolution requests to different IP addresses in the distributed cluster. In this way, subsets of the clients will be pointed to each of the geographically distributed sites. Load balancing support using DNS is also described in the paper by Brisco, T., "DNS Support for Load Balancing", RFC 1794, Rutgers University, April 1995.

A key problem with this approach is that the RR-DNS leads to poor load balance among the distributed sites, as described in the paper, Dias, D. M., Kish, W., Mukherjee, R., and Tewari, R., "A Scalable and Highly Available Web Server", Proc. 41st IEEE Computer Society Intl. Conf. (COMPCON) 1996, Technologies for the Information Superhighway, pp. 85–92, Febuary 1996. The problem is due to caching of the association between names and IP addresses at various name servers in the network. Thus, for example, for a period of time (time-to-live) all new clients behind an intermediate name server in the network will be pointed to just one of the sites. This leads to hot spots on nodes of the server cluster that move to different cluster nodes as the time-to-live periods expire.

One known method to solve this problem within a cluster of nodes at a single site is to provide a encapsulated cluster using a so-called TCP router as described in: Attanasio, Clement R. and Smith, Stephen E., "A Virtual Multi-Processor Implemented by an Encapsulated Cluster of Loosely Coupled Computers", IBM Research Report RC 18442, 1992, and, U.S. Pat. No. 5,371,852, Dec. 6, 1994, by Attanasio et al., entitled "Method and Apparatus for Making a Cluster of Computers Appear as a Single Host" (Attanasio). Here, only the address of the TCP router is given out to clients; the TCP router distributes incoming requests among the nodes in the cluster, either in a round-robin manner, or based on the load on the nodes. In Attanasio, the TCP router can act as a proxy, where the requests are sent to a selected node, and the responses go back to the TCP router and then to the client. This proxy mode of operation can lead to the router becoming a bottleneck, and for this reason is not considered further herein. In another mode of operation, which we will refer to as the forwarding mode, client requests are sent to a selected node, and the responses are sent back to the client directly from the selected node, bypassing the router. In many environments, such as the World Wide Web (WWW) the response packets are typically much larger than the incoming packets from the client; bypassing the router on this response path is thus critical.

The work described in the previous paragraph was expanded upon and improved in the co-pending patent application Ser. No. 08/701,939 "Weighted TCP Routing to Service Nodes in a Virtual Encapsulated Cluster" by C. Attanasio, G. Hunt, G. Goldszmidt, and S. Smith. This patent application describes how the same facility can be made recoverable. The TCP router is enhanced to handle virtual clusters, and multiple target addresses within a router, and the manager component is described which collects information and dynamically controls the weighted routing.

As described above, the TCP router would typically send different client TCP connection requests to different nodes within a cluster. There are several applications where specific multi-node servers would be preferred for certain client requests, based on either the static or dynamic state of system. Thus a key problem with the TCP router approach is providing support for client requests with affinity requirements.

An important example of this is the support of the Secure Sockets Layer (SSL) protocol, which is a very popular protocol used for the exchange of secure information between clients and servers on the WWW, and for other environments. In SSL, a session key is generated by the client, and passed to the server after encrypting it using the server's public key. Session keys have a lifetime (e.g. 100 seconds). Subsequent SSL requests from the same client within the lifetime of the session key will reuse the key. With the base TCP router method, subsequent requests from the same client could be routed to another node, but would require re-negotiating a session key, which is an expensive operation. Often, a single web page may contain embedded images, which are typically requested from the server simultaneously, after the base HTML page is received by the web browser. If each embedded image is to be retrieved using SSL, and if the requests were routed to any node by the (base) TCP router, a new session key would again have to be re-negotiated for each embedded element of the page, which can be prohibitively expensive in terms of the resource usage and latency.

More generally, applications may have affinity to nodes based on the state at the server. The state at the server could be dependent on previous routing decisions, as in the case of SSL, or it could be due to information or computation at the server. For example, a cluster of servers could also have a partitioned database, and a client may have affinity with a node of the cluster, based on the database partition located at that node.

Thus there is a need to provide a method for affinity-based routing in an encapsulated cluster or virtual encapsulated cluster, wherein a TCP router sends client requests to nodes in the cluster, and wherein the responses go back directly to the client from the node selected by the TCP router to handle the client request, the alternative where the response request goes through the router.

SUMMARY

Accordingly, it is an object of this invention to provide a method for providing an encapsulated cluster with affinity-based routing of client requests to nodes in the cluster.

It is yet another object to keep the method for affinity routing simple but effective, so that the overhead for affinity routing and load balancing is small compared to that for serving the client requests.

Another aspect of this invention provides a method for affinity-based routing in an encapsulated cluster wherein specific clients may have affinity with specific nodes in the cluster that may be based on the static state or dynamic state at the cluster node independent of where previous requests from this client were routed.

In a computer network including an encapsulated cluster of nodes, an affinity-based method for routing client requests to one of a plurality of server nodes in the cluster having features of the present invention includes the steps of: communicating from the client to a router node, a plurality of packets associated with a connection; and routing the packets to a preferred server having affinity with the client according to state information maintained at the router.

Another aspect of this invention provides an affinity-based routing in the encapsulated cluster that may depend on a dynamic state of a cluster node to which previous client requests were routed. In accordance with this aspect of the present invention, wherein the state information includes information on a previous connection to one of the server nodes, the routing step includes the further steps of: determining if one of the packets is associated with the previous connection; routing the request to the server node associated with the previous connection; and if the state information is not found, creating and storing at the router, state information associated with the connection.

According to yet another aspect of the present invention, these and further objectives and advantages are achieved by designating a node at each of the multi-node clusters as a TCP router, wherein clients are assigned to one of the multi-node clusters by giving them the address of the corresponding TCP router, and wherein the TCP router selects a node in the cluster to process the client request based on state maintained in the TCP router. The state in the TCP router may be set by the router (e.g. based on previous routing decisions) or may be set by one or more servers (e.g. based on the state of the servers).

A preferred embodiment of the present is described in the context of supporting SSL. Those skilled in the art will readily appreciate that it can be used for providing affinity routing in a more general context. Those skilled in the art also recognize that this method can be easily extended to recoverable virtual encapsulated clusters.

A method in accordance with the preferred embodiment of the present invention extends the TCP router to maintain an affinity table of recent client TCP connections after the TCP connections have been closed (by a FIN command). This affinity table contains information of the client (or proxy) IP address, (an indication of the service that was requested) the server node that it was previously routed to, and the time at which the initial connection was made (or the time at which the previous connection was closed). If another SSL connection request arrives at the TCP router from the same client (or proxy) IP address, within a pre-specified (or configured) affinity period for the corresponding entry in the affinity table, then the TCP router allocates that TCP session request to the same node as specified in the corresponding affinity table entry. (Note that an SSL connection request can be distinguished because it uses a pre-assigned and different port number.) In this manner, a client that makes an SSL request is routed with affinity to a particular node for a configurable affinity time period (also known as the affinity period). For SSL, the configurable affinity time period can be set to be the lifetime of the SSL session key.

Entries in the affinity table become stale after the affinity period from the initial connection (or from the last connection close) has expired. These stale entries can be deleted either when encountered during a search of the table, or by a background garbage collector. For a bounded affinity table size, if the size of the table reaches the bound, entries can be eliminated based on stale connections first, time since last access, or other cast-out criteria.

It is possible that the node involved in the affinity routing may become overloaded, and it may then be desirable to allow routing to another node in the cluster. Based on the load on the preferred node due to affinity routing, the router may choose to route a request to another node in the cluster; for the SSL case, this would require renegotiating a new session key. Thus the routing decision could be based on both the load on the affinity-based node and on the overhead involved in negotiating the new session key. According to yet another aspect of the present invention, for environments wherein a parallel database is used at the cluster nodes, specific clients may have affinity with specific nodes in the cluster. For example, in the TCPB benchmark, clients associated with a bank branch have affinity with the node that has the branch partition; in the TPCC benchmark, clients associated with a warehouse have affinity with the node that has the partition for the corresponding warehouse. Such cases of affinity of clients to nodes may occur for other environments as well. Here, a method according to the present invention includes the steps of: the router initially routing a client request for which the router does not have any cached information to any node in the server, or based on server load; the server node (e.g., in a CGI script) could then determine the best cluster node to process this client request based on the database partitioning, or some other criteria; and the server node then resets the corresponding entry in the router affinity table to the correct node, so that subsequent requests from this client would be routed to the node to which the client had affinity.

In other environments, there is affinity between different ports, such that if a specific port from a particular client was previously routed to specific server node, then another request from the same client on a different but associated port needs to be routed to the same server node. For example, with the FTP protocol, there is such an affinity between ports 20 and 21 (the control and data ports); if a specific client with a request to port 20 was previously routed to a server node A, then an associated request from the same client to port 21, while the TCP connection to port 21 is still active, needs to also be routed to server node A. This is accomplished by noting that the two ports have associated affinity. The TCP router keeps connection records for active connections associated with the primary port. When a new connection arrives for the secondary port, in this case port 20, the TCP router checks the connection records for the primary port, if it finds one for the same client it routes the new request to the indicated server. For still other applications, for example DB2, the need for affinity is not dependant on a port or pre-specified time out. A sequence of requests from a particular client needs to be routed to the same server because of state at the server as previously discussed. According to yet another aspect of the present invention, the server may specify the start and end of the affinity requirement. Specifically, interfaces can be added to the router which allow a server in the cluster to connect to the router and specify the start and end of affinity for any one of it's clients. When affinity is turned on, all requests for a single client will be routed to the indicated server until affinity is turned off.

BRIEF DESCRIPTION OF THE DRAWINGS

These, and further objectives, advantages, and features of the invention, will be more apparent from the following detailed description of a preferred embodiment and the appended drawings in which:

FIG. 3 depicts an example of the affinity table of FIG. 1;

FIG. 4 is a layout for an affiliation table having features of the present invention;

DETAILED DESCRIPTION

Figure 1:
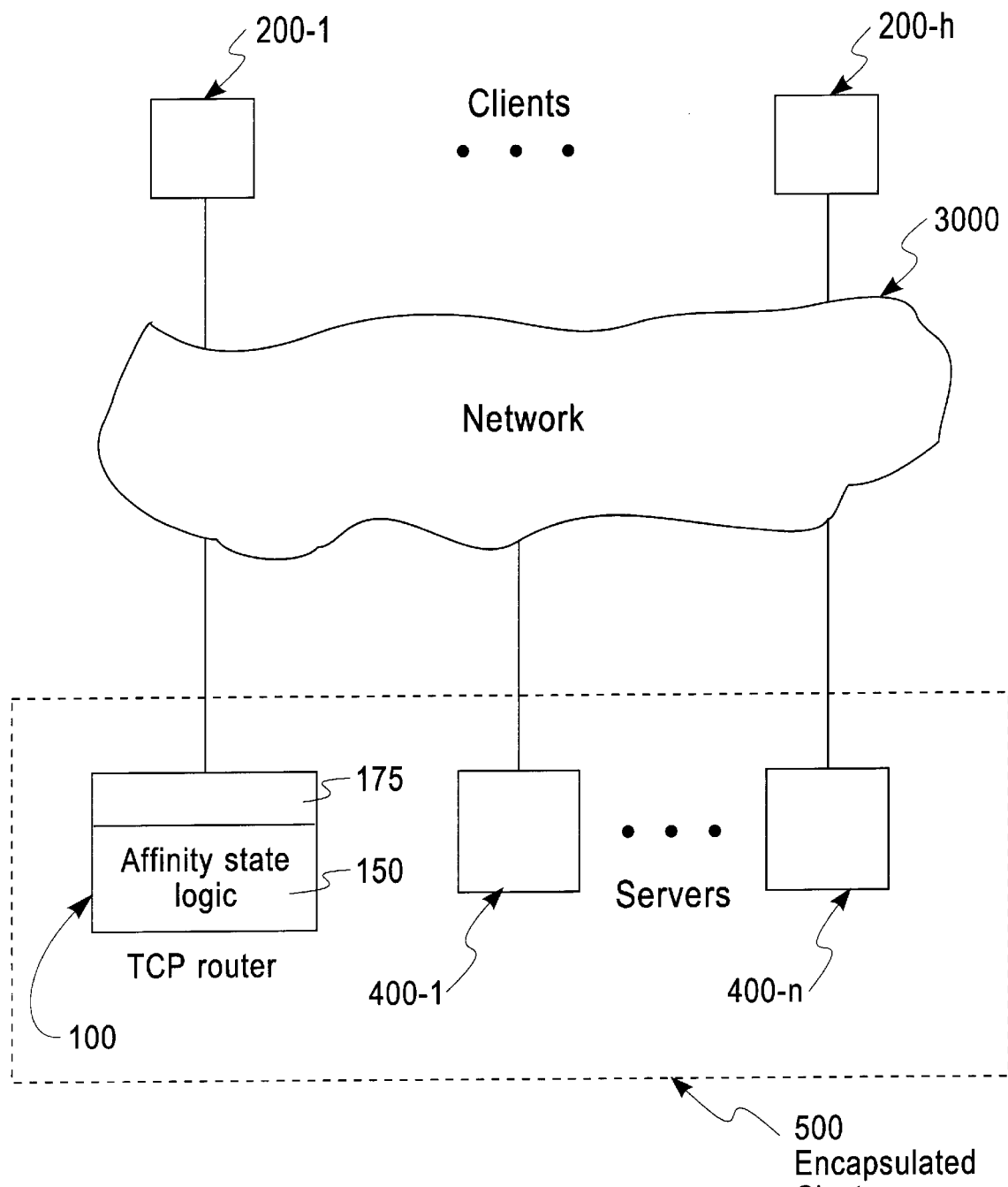
FIG. 1 is a diagram of the environment with a multi-node server having features of the present invention.

A preferred embodiment of the invention is described below. FIG. 1 illustrates an example of an environment with a multi node cluster 500 having features of the present invention. Clients 200-1 through 200-h connect through a network 3000 to the multi-node (also called encapsulated) cluster 500. The multi-node cluster 500 has a node designated as the TCP router 100, and a set of server nodes 400-1 through 400-n. Clients are given out the network address of the TCP router 100, and send requests for service to the multi-node cluster 500 to this address; thus client requests arrive at the TCP router node. According to the present invention, the TCP router preferably includes affinity state logic 150 which maintains state information in one or more affinity tables 175. An example of the affinity state logic 150 will be described with reference to FIG. 2. Examples of the affinity tables 175 will be described with reference to FIGS. 3 through 5. Referring again to FIG. 1, the TCP router 100 selects a node in the cluster to process the client request based on state maintained in the affinity table 175. The state information in the affinity table 300 may be set statically, modified by the router (possibly based on previous routing decisions), and/or modified by one or more servers (possibly based on server state information).

Figure 2A:
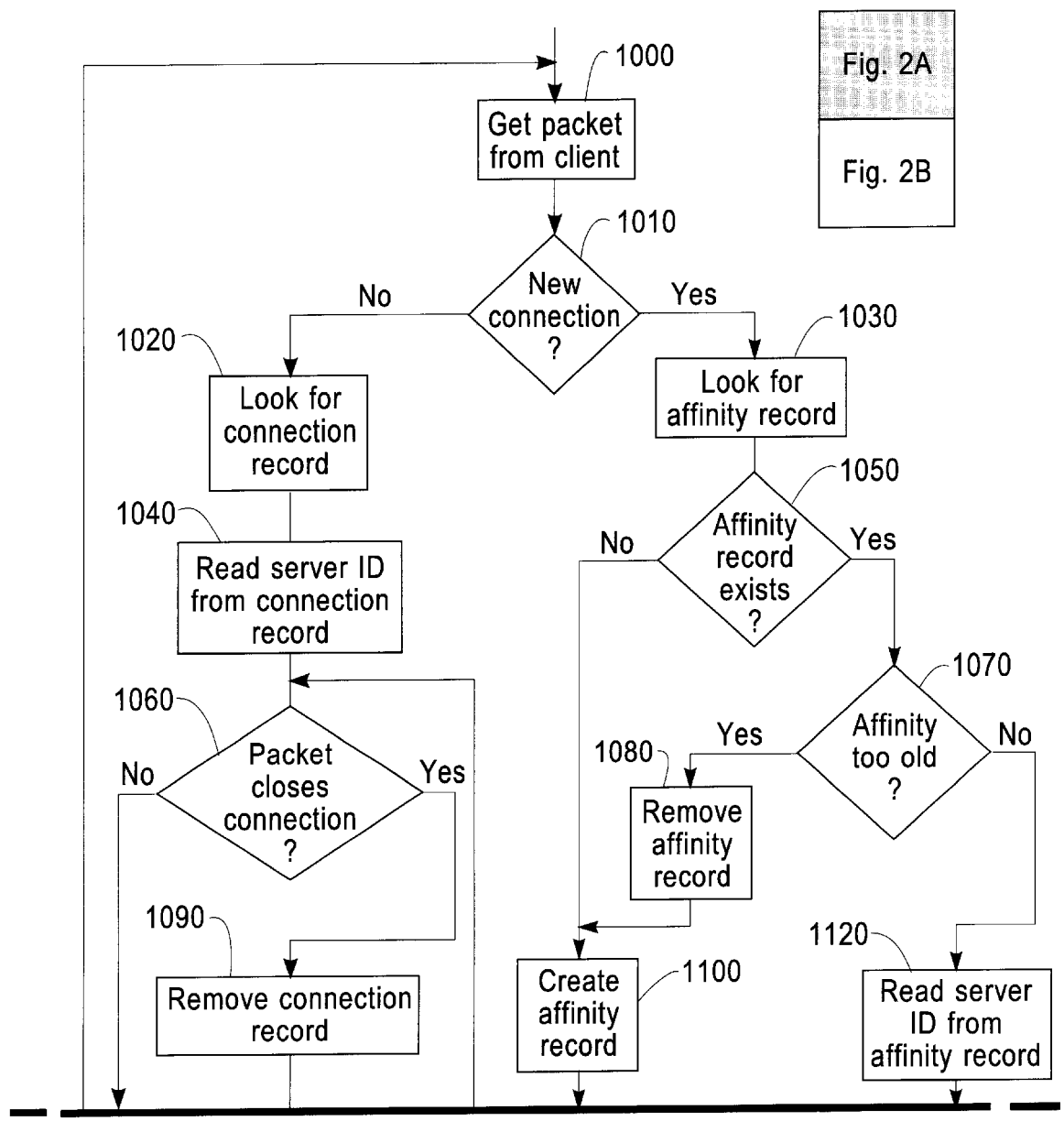
FIG. 2 depicts an example of the affinity state logic of FIG. 1 for affinity-based routing based on previous routing decisions in accordance with the present invention.
Figure 2B:
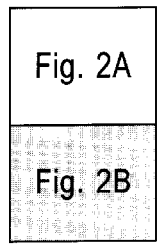
Figure 2B:
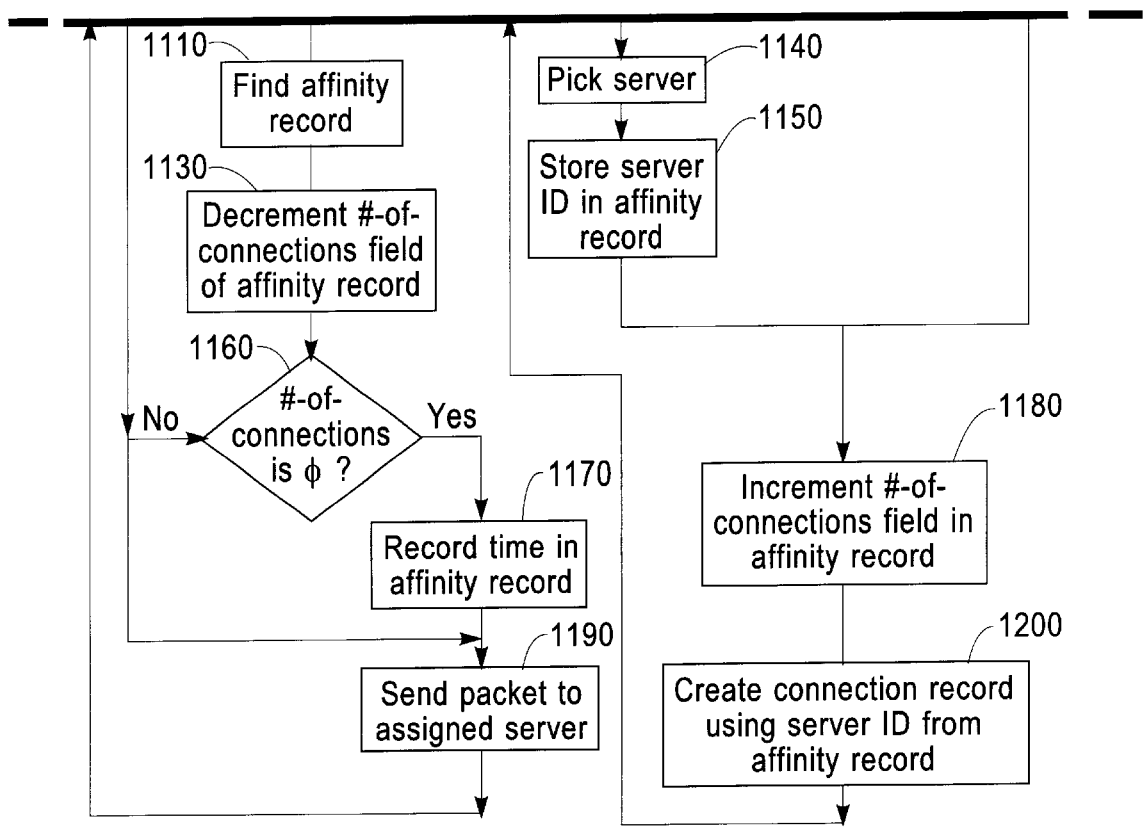

FIG. 2 depicts an example of the affinity state logic 150 for routing a client request to a server having features of the present invention. As depicted, the process begins in function block 1000 by a router 100 receiving a request packet from a client. On a router node running the AIX operating system and for packets using the TCP/IP protocol, this process can take place after the IP level of the communication software has determined that this packet is addressed for the router node itself, but before the TCP level of the communication software has started to process the packet. In decision block 1010, it is determined if this request is part of an existing connection or is the start of a new connection.

For packets using the TCP/IP protocol, this is done by seeing if the TH_SYN bit in the flags field of the packet is set to one. If this packet is the start of a new connection, execution continues with function block 1030, otherwise it is part of an existing connection, and execution continues with function block 1020.

In function block 1030, a search is made in a table called the affinity table 300 shown in FIG. 3.

Referring now to the example depicted in FIG. 3, an affinity table 300 contains information about recent connections. The information can include: a client (or proxy) IP address 310, (an indication of the service that was requested); the server node 320 that it was previously routed to; and the time 330 at which the initial connection was made (or the time at which the previous connection was closed). Each row in this table is known as an affinity record 340. The affinity table 300 is searched for an affinity record with the same address as the client address in the newly arrived packet. Alternative implementations include, but are not limited to: arrays; balanced trees; and hash tables.

Then, in decision block 1050, it is determined whether the search was successful. If yes, execution proceeds to decision block 1070, otherwise, when the search fails, execution proceeds to function block 1100.

In decision block 1070, the affinity record is tested to determine if it is too old. For example, each affinity record could include a time stamp, which is then compared to the current time. If the difference in those times exceeds a given threshold (also called the affinity period), for example 100 seconds, then execution proceeds to function block 1080, otherwise the affinity record is not too old, so execution proceeds to function block 1120. The example of 100 seconds is chosen because, in the case of the SSL protocol used by Web servers, the need to maintain affinity between a given client and its server node elapses after 100 seconds. Thus, after 100 seconds elapses new keys need to be negotiated anyway.

In function block 1080, the affinity record for which the affinity period has elapsed is removed from the affinity table 300. Then, in function block 1100, which follows both decision block 1050 and function block 1080, a new affinity record is created. A simple optimization is to avoid a destroy followed by a create reusing the old record. In any case, this new affinity record stores the address of the client that sent the packet of current interest.

Then, in function block 1140, a server is picked to process this client request. This can be done in any number of ways, based, for example, on load information regarding work at each server.

One of the simplest ways is to assign each new client packet to a new server, each in its turn, that is, by a round-robin approach.

In function block 1150, a server ID for the server assigned (in function block 1140) is also recorded in the new affinity record.

For an affinity record that is not too old, execution continues with function block 1120, where the server ID recorded in the affinity record identifies the server to be assigned to this new client request. Execution continues from both function blocks 1150 and 1120 to function block 1180. Preferably, each affinity record includes a field used to keep track of the number of connections that are associated with this client. In block 1180, this field is incremented, to indicate that there is another such connection.

In function block 1200, a connection record is created. Such records contain sufficient information to identify this connection and a field indicating which server was assigned for this connection. In the case of the TCP/IP protocol, the IP address of the client, the IP address of the router, and the port numbers at each, are sufficient for identifying a connection. The connection record is stored in the connection table, which is separate from the affinity table 300. Execution continues from here to function block 1060.

In function block 1020, reached from decision block 1010, the connection table is searched for a connection record whose identifying information matches the incoming packet from the client. This search is based on the addressing information in the packet and the corresponding information in the connection records. It is assumed that there is such a connection. (If there is, in fact, no corresponding connection record, the packet can be discarded and execution could continue at function block 1000.) Then, in function block 1040, the server ID information in the connection record is read and used to identify the assigned server for this connection.

In decision block 1060, the packet is checked to see if it marks the closing of a connection. In the TCP/IP protocol, such packets have either the TH_FIN or TH_RST bits set in the flag field of the packet. For packets indicating the closing of a connection, execution proceeds to function block 1090, while for packets not so indicating, execution proceeds to function block 1190.

In function block 1090, the connection record that was found, is removed from the connection table. Then, in function block 1110, the affinity record for this client is located, based on the address in the client in the request packet. In function block 1130, the field in the affinity record that is used to keep track of the number of connections that are associated with this client, is decremented.

Then, in decision block 1160, the number-of-connections field is compared with zero. If the number is zero, execution proceeds to function block 1170, otherwise, for a non-zero count, it proceeds to function block 1190.

In function block 1170, the current time is read from the real-time clock on the router node, and the time is recorded in the time stamp field of the affinity record located back in function block 1110. Then execution proceeds to function block 1190.

In function block 1190, the client request packet is sent off to the server that had been chosen in either function block 1040, function block 1140, or function block 1120. After that, execution continues with function block 1000.

Alternative Embodiments

Those skilled in the art will readily appreciate that various alternatives and/or extensions to the disclosed scheme can be used within the spirit and scope of the invention as claimed, including the following.

In the preferred embodiment, all packets from the same client address are routed to the same server if an affinity record, which is not stale, is found by the TCP router. In a first generalization, an affinity index (e.g., destination port number) may be specified with each request. The router can route requests differently depending upon the affinity indices. In order to achieve this functionality, the router may maintain different affinity tables for different affinity indices. Each affinity table 300 can have a different affinity period. This generalization provides the selective support of affinity routing; for example, for the SSL protocol, which uses port 443, the affinity index can be the port number and affinity routing may be selectively performed only for port 443 requests. As an example of this first generalization, the router could route requests which use Port 443 using an affinity period of 100 seconds. Requests which specify Port 80 could be routed with no affinity. Requests which specify Port 85 could be routed with an affinity period of 300 seconds.

Figures 5, 6:
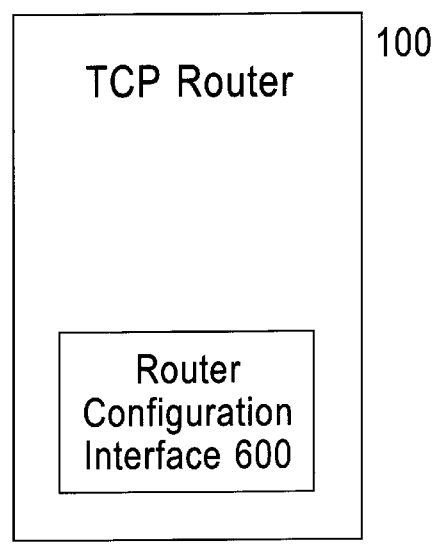
FIG. 5 is a layout for an expanded affinity table.
FIG. 6 depicts a router configuration interface.

In the above embodiment, the affinity table 300 entries are made and deleted by the TCP Router 100. A second generalization is to extend the scheme to allow server nodes 400-1 through 400-n to insert, modify or delete affinity records in the affinity table 300. Those skilled in the art will readily appreciate that this can be done by providing remote function invocations at the TCP router node from the server nodes that provide interfaces to insert, modify or delete affinity records (FIG. 6). An example of using this extension is for the parallel database case outlined in the Summary of this application. In this case, clients have affinity with specific server nodes. However, when the client makes an initial TCP connection through the TCP router, the router does not know to which node the client has affinity. Thus, as described in the preferred embodiment, the TCP router 100 routes the request to a first server node selected from nodes 400-1 through 400-n, without regard to affinity. At the first server node (e.g., in a CGI script), the best (second) server node can be determined; for example, the parallel database partitioning key and function is known, and it can be therefore determined which (second) server node the client has affinity to. The first server node can then make a remote function call to the TCP router to modify the affinity record for that client and source port to change the server identification to the second server node as determined by the first server node. The first server node could also change the entry in the affinity record for the time period for which this affinity record is active, after which it becomes stale and would be deleted.

A third generalization to the method described in the preferred embodiment relates to affiliation between affinity indexes (e.g. affiliation between ports). As outlined in the summary section, there are cases where connection requests from the same client to different ports need to be routed to the same server, which we refer to as affiliation between the ports, and more generally, between affinity indexes. To implement this method, an affiliation table 400 (FIG. 4) is maintained that indicates affiliation between affinity indexes. As depicted in FIG. 4, each record 430 in the affiliation table 400 includes an affinity index 410 and a pointer to a list of affiliated indices 420. Referring again to FIG. 2, an additional check can be made in block 1010 to determine if an existing connection from the same client address exists to an affinity index 410 with which the current request has affiliation. If so, the same server as was previously chosen for the previous connection from the same client and affiliated source port is selected for the new connection request; additional processing then continues as in block 1200. Those skilled in the art will readily appreciate that an arbitrary number of ports with affiliation can be supported. This generalization can be used to support the FTP protocol where there is affinity between Ports 20 and 21. Alternative implementations include, but are not limited to: arrays; balanced trees; and hash tables.

The third generalization above provides affiliation between affinity indexes (e.g. affiliation between ports) for the duration of a connection. A fourth generalization provides affiliation between affinity indexes after a connection, using the affinity table 300 entries, closes, by examining whether an affinity record exists for the same client address and with an affinity index to which the new connection request has affiliation.

A fifth generalization adds interfaces at the TCP router which can be invoked from the servers in the cluster to specify the start and end of affinity sessions. The time-out associated with an affinity session is also a configurable parameter which can be specified by the server which established the connection.

A sixth generalization combines the affinity-based routing described in the first generalization above with routing requests to subsets of nodes which is described in the co-pending U.S. patent application Ser. No. 701,939, filed Aug. 23, 1996, entitled "Weighted TCP Routing to Service Nodes in a Virtual Encapsulated Cluster" by Attanasio et al.; and the U.S. Pat. No. 5,371,852, issued Dec. 6, 1994, entitled "Method and Apparatus for Making a Cluster of Computers Appear as a Single Host", by Attanasio et al. These describe a method whereby the TCP router can route requests to any subset of nodes of a virtual encapsulated cluster based on the ports associated with requests; for example, the router could treat port 444 such that all requests associated with this port are routed to a specific server. By contrast, according to the present invention, port numbers can be used to specify affinity-based routing as well as subsets of nodes for routing requests. For example, the affinity-based router could treat affinity index (port) 443 such that requests from the same client within 100 seconds of each other with this affinity index are routed to the same server. Concurrently, it could treat affinity index 444 such that all requests with this affinity index are routed to the same server.

A seventh generalization would be for the router to use different routing rules not just for different affinity indices but also for different combinations of affinity indices and clients. For example, requests from client a with affinity index 1 could be treated using the following routing rule: All such requests within 100 seconds of each other should be routed to the same server.

Requests from client b with affinity index 1 could be treated using the following routing rule: All such requests within 50 seconds of each other should be routed to the same server.

Requests from all other clients with affinity index 1 could be routed using the following routing rule: All such requests should go to either server x or server y where x and y are two nodes making up the virtual encapsulated cluster.

One way of achieving this functionality is to replace affinity tables 300 with expanded affinity tables 500 shown in FIG. 5. Each row of this table is known as an expanded affinity record 510. The client address 515, server node 530, and time fields of an expanded affinity record 510 are analogous to the corresponding fields of affinity records 340. Expanded affinity records are indexed by client address 515 and affinity index 520 pairs. The record 510 can also include a pointer to a rule description 550. Different routing rules can be used for each combination of client address 515 and affinity index 520. Alternative implementations include, but are not limited to: arrays; balanced trees; and hash tables.

Default routing rules can be specified for most combinations of client addresses and affinity indices. It is only necessary to maintain expanded affinity records for client address-affinity index pairs with non-default routing rules.

An eighth generalization is to allow any of the servers to modify the routing rules or expanded affinity tables dynamically. This can be accomplished by a set of API's on the router known as a router configuration interface 600 (see FIG. 6). Those skilled in the art will appreciate that the router configuration interface can be used to allow the servers 400-1 . . . 400-n to modify the affinity tables 300, the expanded affinity tables 500 and the rules used by the router 100 to send requests to the servers 400-1 . . . 400-n.

While the embodiments herein have been described for some specific cases of affinity based routing in the TCP router, those skilled in the art will readily appreciate that other affinity routing schemes can be devised within in the spirit and scope of the invention as claimed.

We claim:

1. In a computer network including an encapsulated cluster of nodes, an affinity-based method for routing a plurality of client connections to one of a plurality of server nodes in the cluster, wherein a connection comprises at least one packet, said method comprising the steps of:

communicating from the client to a router node, one or more packets associated with a first connection to be established with one of said plurality of server nodes in said cluster;

routing the packets of said first connection to a first server from the client;

storing state information about said first connection to said first server at said router;

terminating said first connection;

communicating from the client to the router node, one or more packets associated with a separate subsequent connection to be established with one of said plurality of server nodes in said cluster; and routing the packets of the subsequent connection from the same client to the first server having affinity with the client according to state information maintained by the router.

2. The method of claim 1, wherein the state information includes information on at least one previous connection to one of the server nodes, said step of routing the packets of a separate subsequent connection further comprising the steps of:

determining from the state information if one of the packets is associated with a previous connection; and if one of the packets is associated with a previous connection, routing the packet to said first server associated with the previous connection; and if none of the packets are associated with a previous, creating and storing by the router, state information associated with the new connection.

3. In a computer network including an encapsulated cluster of nodes, an affinity-based method for routing a plurality of client connections to one of a plurality of server nodes in the cluster, wherein a connection comprises at least one packet, said method comprising the steps of:

communicating from the client to a router node, one or more packets associated with a first connection to be established with one of said plurality of servers in the cluster;

routing the packets of the first connection to a first server node in said encapsulated cluster; and said server communicating to the router information for a start of an affinity requirement wherein one or more separate subsequent connections from the same client are routed to a server belonging to the set S associated with the affinity requirement.

4. The method of claim 1, wherein the router includes an affinity table for associating one or more client connections with one or more preferred server nodes, the table including one or more affinity records, each record including one or more preferred server node identifiers, one or more client addresses and one or more affinity indices, and wherein the client connection includes one or more affinity indices and wherein said step of routing the packets to a preferred server further comprises the steps of:

determining if there is an affinity record having a matching client address and matching affinity index for the client connection; and if such an affinity record is found, communicating the client connection to a server node identified in said affinity record.

5. The method of claim 1, wherein said step of routing depends on one or both of a static state and a dynamic state at the server nodes, and wherein the network address of the router is provided to the client, further comprising the steps of:

(i) selecting a preferred server node to service the client connection;

(ii) creating an affinity record including the client address, an identifier for the preferred server node, and the time at which the affinity record was created; and (iii) sending the client connection to the preferred server node, such that responses from the preferred server node go directly to the client.

6. The method of claim 5, wherein the affinity record further includes a time stamp associated with one or more of the client connections for the creation or modification of the affinity record, the method further comprising the steps of:

identifying an affinity record with a matching client address wherein the difference between the current time and the affinity record time stamp is less than a predetermined threshold; and sending the client connection to a server node indicated in an identified affinity record.

7. The method of claim 1, wherein the router is a TCP-router.

8. The method of claim 1, further comprising the steps of:

a server S determining that the client connections should be serviced by a server belonging to a particular set of one or more server nodes; and said server S causing the state information maintained by the router to be modified, enabling one or more subsequent connections from the client to be routed to a server belonging to said set of one or more server nodes.

9. The method of claim 1, wherein the encapsulated cluster includes a database partitioned across a plurality of the nodes, further comprising the steps of:

routing one or more packets associated with a connection for which the router does not have affinity information, to a server node S in the encapsulated cluster;

said server S determining the preferred server to handle connections from said client based on a database partitioning; and said server S causing the state information maintained by the router to be modified, enabling one or more subsequent connections from the client to be routed to the preferred server.

10. In a multi-node server environment wherein client connections can be satisfied by routing a client connection to a subset of the servers and wherein one or a subset of the servers may be preferred for handling a connection from a client, a preference based on one or both of static and dynamic state at the servers, wherein a client connection comprises at least one packet and has an associated affinity index, wherein a node is designated as a router, and wherein the network address of the router is given out to clients, a method for the router to send client connections to a server node, said method comprising the steps of:

(a) determining if there is an affinity record for the client and said affinity index, and if there is no affinity record, performing the additional steps of:

(i) selecting one of said server nodes to service the client connection;
(ii) creating an affinity record containing the client address and the server node selected to handle the connection;
(iii) sending the connection to the selected server node, such that responses from the server go directly to the client; and
(iv) establishing subsequent separate connections from the same client directly to the selected server node.

11. The method of claim 10, wherein the affinity record includes one or more of the affinity index and the time at which the affinity record was created.

12. The method of claim 10, wherein the router is a TCP-router.

13. The method of claim 1, wherein the client connection includes one or more affinity indices, and wherein said step of routing the packets to a preferred server further comprises the step of identifying the preferred server from an address of the client communicating to the router and the one or more affinity indices included with the client connection.

14. The method of claim 3, further comprising the step of:
communicating to the router, information for an end of affinity requirement, wherein one or more subsequent connection for the client are not routed to a server belonging to said set S.

15. The method of claim 4, wherein the client request includes multiple affinity indices, and said determining if there is an affinity record, further comprises the step of:
comparing the affinity indices associated with the client connection with at least one set of affinity indices associated with the affinity record.

16. The method of claim 8, wherein said server S is the preferred server.

17. The method of claim 14, further comprising the step of terminating the affinity requirement by deleting information maintained by the router for said affinity requirement.

18. A program storage device readable by a machine, tangibly embodying a program of instructions executable by the machine to perform method steps for an affinity-based method of routing client connections to one of a plurality of server nodes in an encapsulated cluster of nodes in a computer network as claimed in claim 1.

19. A program storage device readable by a machine, tangibly embodying a program of instructions executable by the machine to perform method steps for an affinity-based method of routing client connections to one of a plurality of server nodes in an encapsulated cluster of nodes in a computer network as claimed in claim 10.

* * * * *